UNITED STATES PATENT OFFICE.

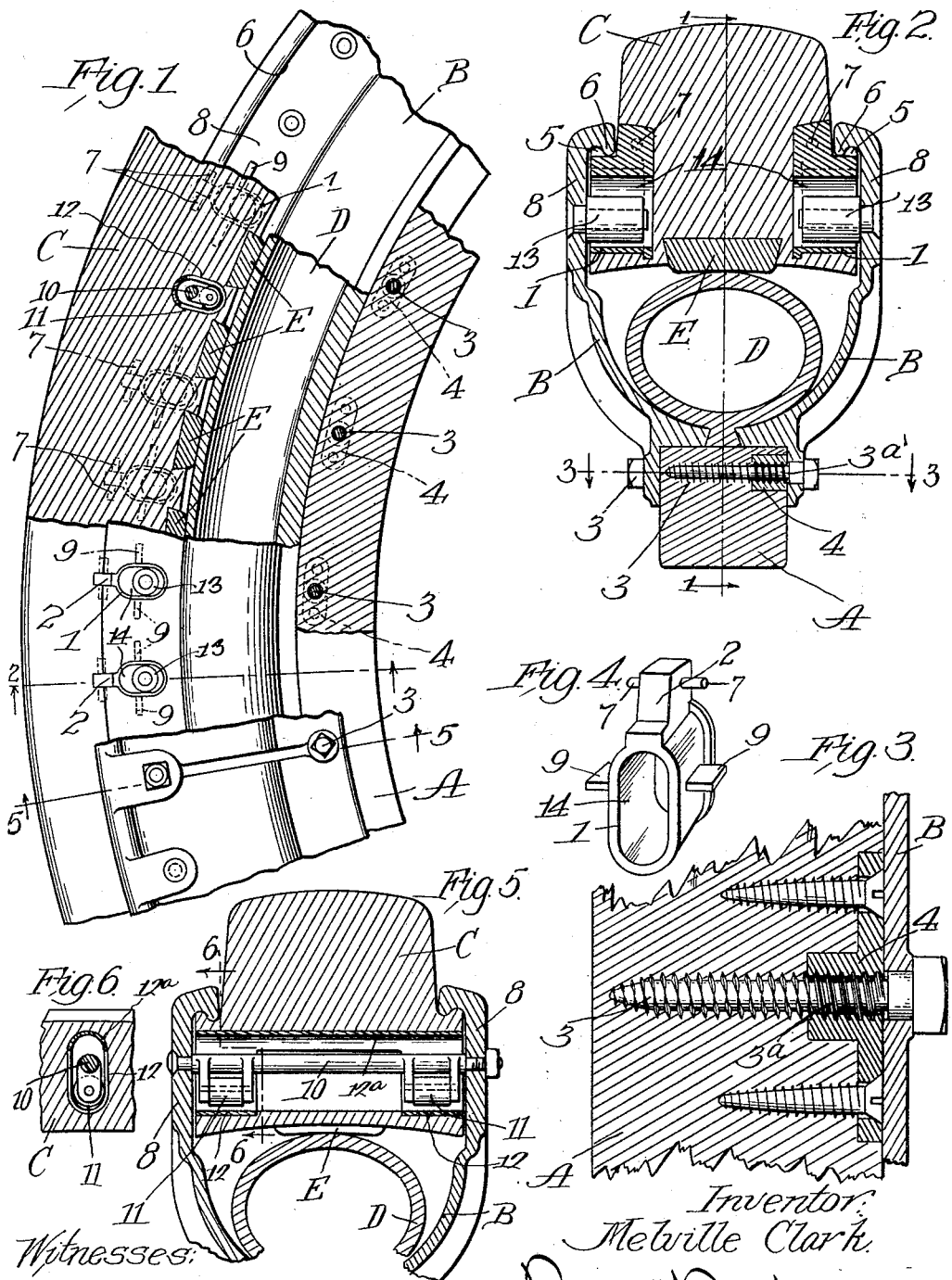

MELVILLE CLARK, OF CHICAGO, ILLINOIS.

VEHICLE WHEEL-TIRE.

1,108,702.  Specification of Letters Patent.  Patented Aug. 25, 1914.

Application filed September 8, 1911, Serial No. 648,348. Renewed November 21, 1913. Serial No. 802,328.

*To all whom it may concern:*

Be it known that I, MELVILLE CLARK, a citizen of the United States, residing at Chicago, in the county of Cook and State of Illinois, have invented certain new and useful Improvements in Vehicle Wheel-Tires, of which the following is a specification, reference being had to the accompanying drawings, forming a part thereof.

The purpose of this invention is to provide an improved construction of a tire for vehicle wheels of the general character commonly called pneumatic or cushion tires, especially adapted for automobiles.

It consists in the elements and features of construction shown and described, as indicated in the claims.

In the drawings:—Figure 1 is a partly sectional side elevation of a segment of a wheel rim and tire embodying this invention, section being made at the plane of the line 1—1 on Fig. 2. Fig. 2 is a section at the line 2—2 on Fig. 1. Fig. 3 is a section at the line 3—3 on Fig. 2. Fig. 4 is a perspective view of a metal fitting which is embedded in the tread member of the tire for certain specific purposes of this invention. Fig. 5 is a section at the line 5—5 on Fig. 1. Fig. 6 is a section at the line 6—6 on Fig. 5.

In the drawings, A represents the wheel felly made of wood, as in ordinary construction. B,—B, are metal guards, each annular in form, extending entirely around the wheel which are rigidly secured at opposite sides of the felly binding the latter between them, said guards being adapted to retain between them the pneumatic and cushioning elements of the tire, which consist of the tread element, C, of firm rubber or like material and the pneumatic or inflatable tube, D, seated between the guards, B, within the tread member, C.

One feature of this invention relates to the means of securing the two guards, B,—B, upon the wooden felly, A. It is well understood that for removing or replacing the more destructible element of the tire,— that is, the tread and pneumatic tube,— one of the guards, B, is usually removed, the other guard being preferably left undisturbed. It is well understood to be objectionable, when it can be avoided, to secure the guards to the felly by means of bolts and exterior nuts, because of the liability of the nuts to become loosened unless they are provided with locking devices or jam-nuts, and the extra protrusion which they cause, especially when provided with locking or jam-nuts and even when such devices are not provided. It has therefore been found preferable to secure the guards to the felly by lag bolts or wood screws of deep thread, adapted for screwing into the wood, cutting their own thread therein, a suitable aperture being first bored. Such screws, when thus forced into the wood by cutting the way by their own thread constitute an attachment secure against any liability of the lag bolts to become loosened, the wood of the character used for wheel fellies obtaining a sufficiently firm grip upon the screw to operate as securely as any lock nut device; but the repeated removal and re-insertion of the screws which secure the removable guard soon causes the screws to cut away, more or less, their seat in the wood of the felly, so that they no longer hold securely. This is largely because it is difficult after having withdrawn one of these lag bolts, to re-insert it with perfectly exact engagement of the thread of the lag bolt in the thread which it has previously cut in the wood, and a slight error in starting causes a new thread to be cut across the old one or a little aside from it, and thus after two or three insertions and removals the entire wood thread is found cut away. To overcome this difficulty, I form the lag bolts or screws, 3, which secure the outer guard, one of the guards, B, designed to be removable, with the customary form of acute-angled thread suitable for cutting the thread in and engaging the wood for a certain distance from the point up toward the head of the bolt, and then as shown at $3^a$, and thence on to the head or to within a distance of the head a little less than the thickness of the guard at the point at which the bolt passes through it and continue the thread with the same pitch as the part, $3^a$, but of different form and depth, adapted for engagement with a metal nut, 4, which is led into the side of the felly so as to be outwardly flush therewith, and secured against turning therein. With this construction the thread, $3^a$, of the bolt engages with and is guided by the thread of the nut in starting the bolt in, not only the time it is inserted, but every time thereafter, so that at the second and subsequent insertions the thread cut in the wood by the thread, $3^a$, of the bolt is necessarily entered and followed accurately and without liability therefore, of mutilating the wood thread except to the negligible extent that the friction of the metal thread may have such an effect.

By far the greatest cause of deterioration and destruction of pneumatic cushion wheel tires of the general class to which the tire shown in the drawings belongs is the heating of the rubber, both that of the pneumatic tube and the tread member. This heating is partly caused, no doubt, by the compression to which the air in the pneumatic tube is subjected, but is much more largely caused, according to my experience, by the friction of the two rubber elements, pneumatic tube and tread member, upon each other. This friction is exceedingly severe and rubber surfaces exposed to such friction between them I have found heat very rapidly and with great damage to the rubber which, in fact, becomes vulcanized or hardened by the heating so that it no longer has the resiliency necessary to perform the functions required of it, either in the pneumatic tube or in the tread. The pneumatic tube particularly suffers because being vulcanized and deprived of its elasticity and flexibility at the outer circumference where the tread rests upon and rubs upon it, it no longer endures the tension of the air and bursts. It is a common experience with tires of this general character that in traveling at high speed, from forty to fifty miles an hour, the heating becomes so great that the metal side guards are exteriorly too hot to bear the hand upon them. This temperature is destructive of the elastic qualities of the rubber. I have heretofore employed for this purpose, rollers mounted in housings embedded in the inner side of the tread for receiving the contact of the tube, and such construction is shown in my pending application No. 587,793. In practice, however, the action of the roller upon the outer circumference of the pneumatic tube when the latter is inflated, is only slightly helpful, because the pneumatic tube necessarily from its elasticity and inflation is forced up against the inner circumference of the inner tread between the rollers, and rubs upon the tread at these intervals with the heating effect above described. I have found, however, that by providing at short intervals in the inner circumference of the tread, C, blocks, E, embedded in the rubber of the tread member so as to be firmly held therein, such blocks protruding from the inner circumference of the tread member for seating upon the outer circumference of the pneumatic tube, D, with their inner surfaces tangential to the circumference of the pneumatic tube meeting its circumference about the axis of the wheel, the heating which I have above referred to and which is commonly experienced, is almost entirely prevented, and the highest speed can be obtained for any length of time without producing any increase of temperature which can be observed upon the outside of the cars, thus apparently demonstrating that the chief cause of the heating heretofore noticed is not the mere compression of the air in the pneumatic tube.

The blocks, E, are very efficient when made of any firm, fine-grained wood, such as hard maple. When made of wood, they are preferably creosoted to prevent decay, and the grain is filled with a waxy substance, such as paraffin, which is not injurious to rubber, so that the surface of the block which bears on the rubber tube is substantially deprived of capacity for chafing the rubber. Graphite may be employed when the expense of that material is not a positive objection. Metal may be employed, preferably such as aluminum or tin, but I believe that wood or graphite constitute the best material for the purpose. Preferably the blocks are slightly hollowed transversely of the tire, but in an arc of greater radius than that of the pneumatic tube, so that while the hollowing has a tendency to center the pneumatic tube laterally, the greatest flattening to which the pneumatic tube is likely to be subjected, will not sink the corners or lateral edges of the block into the pneumatic tube, but the surface of the block in transverse plane will at most, only coincide with the flattened curvature of the pneumatic tube. By reason of the fact that these blocks cannot turn or roll in any way in the tread, they operate very efficiently to prevent the pneumatic tube sliding or moving circumferentially at its outer circumference and so prevent its rubbing upon the inner tread, even though under the depression of a load, the pneumatic tube should be pressed upward into contact with the tread member.

In my pending application, No. 587,793, I have shown the rubber treads having annular lateral projections which are engaged by in-turned peripheral flanges of the guards, and means for preventing the creeping of the rubber tread circumferentially with respect to the wheel between the guards, consisting in studs with anti-friction rolls projecting in from the guards, engaging metal-lined sockets in the side of the tread, said sockets being elongated radially with respect to the wheel, to allow for the movement of the tread under changes of load. In the use of this structure I have found that wear occurring between the in-turned flanges of the guards and the outer shoulders of the annular projections on the tread operating to permit further outward movement of the tread than in the original construction, it sometimes happens that the bottom or inner end of the radially-elongated housing or metal lining for the sockets mentioned, reaches and bears against the stud and upon any severe lateral or twisting strain attempting to pry the tread out from the engagement of the over-hanging flanges of the guards, the said housing, or lining, is liable to be torn through the small amount of rubber of the tread which extends radially from it. To overcome this defect, both by preventing the wear mentioned occurring between the flanges of the guards and the outer shoulder of the annular projection of the tread, and also more securely engaging the housings or linings, of the sockets with the tread, I provide a construction which is shown in the drawings and will now be described.

The socket lining, or housing, 1, has formed integrally with it at the end which is to stand outward when it is embedded in the tread, a stirrup-like projection, 2. This projection may be from one-half to three-quarters of an inch wide in direction circumferentially with respect to the wheel and nearly the length of the housing or lining, 1, in direction transverse to the tire. It may project out radially from the outer end of the housing or lining, 1, substantially, or nearly to the outer circumference of the in-turned flange, 8, of the guard. Its outer edge is shaped as seen in Fig. 1, so as to conform to the shape in radial section of the tread at its engagement with the in-turned flange, that is, so as to have a hollowed seat or notch, 5, which is engaged by the inner rounded corner, 6, of the flange, 8, and from said notch extends out radially so as to be flush with the side of the tread in which it is embedded. The housings, 1, having the stirrup projections described, are provided at short intervals, say three inches apart, throughout the circumference of the tire, and thereby there is afforded at these short intervals, a metal bearing or seat for wearing against the in-turned rounded corner, 6, of the car flange, thus relieving the tread rubber very largely of the wear which usually cuts it away quite rapidly at this place. For making the housing with this stirrup extension more secure in the tread, it is formed with wings, 9,—9, projecting laterally, that is, circumferentially with respect to the wheel, said wings being shorter in the direction transverse to the wheel than to the housing, so that they do not reach the lateral surface of the tread and thereby serve to secure the housing, not only against radial stress in the tread, but also against lateral stress which might tend to move it out endwise with respect to the tread. In addition to these wings, 9, the stirrup plug, 2, has projections, preferably two at each side, in the form of studs, 7,—7, which similarly tend to hold the fitting firmly in the tread.

The stud-and-roll abutments rigid with and protruding inwardly from the guards, 8, for engaging the metal housings embedded in the tread member are shown at 13, and the radially elongated sockets for these stud-and-roll abutments are shown at 14.

Another feature of improvement consists in providing the bolts, 10, which connect and space apart the guards, B, B, with anti-friction rollers, 11, 11, and embedding in the tread element, C, housings, 12, 12, which are elongated radially with respect to the wheel, and which take the wear of the rolls, 11, in the radial movement of the tread member under changes of load. The two opposite housings for each bolt are formed integrally and connected by a bridge bar, 12ᵃ; and they extend to the lateral surfaces of the tread member so that they directly receive on their ends any side pressure of the guards upon the tread.

I claim:—

1. In a vehicle wheel tire, in combination with the felly, lateral rigid guards secured thereto; a rubber tread member engaged between the guards and together with said guards and felly inclosing an annular cavity; an inflatable tube inclosed in said cavity and proportioned in respect thereto so as to be inflated to its limit without filling the cavity and so as to present a transversely convex surface toward the tread member, said tread member comprising wooden blocks having the grain filled with a waxy substance, said blocks being embedded fixedly at intervals in the inner circumference of said tread member and formed at their inner surfaces for seating tangentially upon the outer circumference of the inflatable tube.

2. In a vehicle wheel tire, in combination with the felly, lateral rigid guards secured thereto; a rubber tread member engaged between the guards and together with said guards and felly inclosing an annular cavity; an inflatable tube inclosed in said cavity and proportioned in respect thereto so as to be inflated to its limit without filling the cavity and so as to present a transversely convex surface toward the tread member, said tread member comprising paraffin-treated wooden blocks embedded fixedly at intervals in its inner circumference and formed at their inwardly exposed surfaces for seating tangentially upon the outer circumference of the inflatable tube.

3. A vehicle wheel tire comprising, in combination with the rubber tread member and lateral metal guards by which it is retained, the tread member having lateral annular projections forming shoulders facing radially outward, and the guards having laterally inturned flanges which overhang said shoulders for engagement of the tread against radially outward displacement; a multiplicity of metal reinforcements embedded in the tread member having each an edge exposed at the outer surface of the tread member at and adjacent to the angle or curve between said shoulder of the tread and the lateral face thereof extending radially outward from the shoulder, for taking the thrust and wear of the tread member against the guard flanges.

4. In a vehicle wheel tire, in combination with a rubber tread member and lateral metal guards between which it is retained, stud-and-roll abutments projecting inwardly from the guards at relatively short intervals in the circumference thereof, and metal housings embedded in the sides of the tread member elongated radially with respect to the wheel to receive said stud-and-roll abutments with accommodation for the radial movement of the tread member with respect to the wheel, said housings having lateral wings embedded in the substance of the tread member for securing the housings firmly to the latter.

5. In a vehicle wheel tire, in combination with a rubber tread member and lateral metal guards between which it is retained, the tread member having lateral projections forming shoulders which face radially outward, and the guards having laterally inturned flanges overhanging such radially facing shoulders for retention of the tread member against radially outward displacement, said guards having a multiplicity of inwardly projecting stud-and-roll abutments taking into the tread member; metal housings embedded in the tread member having radially elongated cavities forming tracks for said stud-and-roll abutments in the radial movement of the tread member with respect to the wheel, said housings having rigid with them and projecting outward radially with respect to the wheel stirrup lugs having their radially outer ends exposed and conformed to the cross section of the tread member at and adjacent to the angle or curve between the lateral surface of said tread member and its radially facing shoulder.

6. A vehicle wheel tire comprising, in combination with a rubber tread member and lateral rigid guards between which it is retained, said tread member having lateral projections which form shoulders facing radially outward, and the guards having laterally inturned flanges overhanging said shoulders of the tread member; a multiplicity of metal reinforcements embedded in the tread member, each comprising a part which extends radially with respect to the wheel constituting a stirrup having its radially outer end exposed and conformed to the cross section of the tread member at and adjacent to the angle or curve between its lateral surface and its radially outward facing shoulder.

In testimony whereof, I have hereunto set my hand at Chicago, Illinois, this 1st day of September, 1911.

MELVILLE CLARK.

Witnesses:
 Lucy I. Stone,
 Robt. N. Burton.

---

Copies of this patent may be obtained for five cents each, by addressing the "Commissioner of Patents, Washington, D. C."